United States Patent [19]
Suzuki et al.

[11] Patent Number: 5,295,157
[45] Date of Patent: Mar. 15, 1994

[54] EQUALIZATION METHOD UTILIZING A DELAY CIRCUIT

[75] Inventors: Mitsuhiro Suzuki; Takushi Kunihiro, both of Tokyo, Japan

[73] Assignee: Sony Corporation, Japan

[21] Appl. No.: 888,498

[22] Filed: May 27, 1992

[30] Foreign Application Priority Data

Jun. 4, 1991 [JP] Japan .................. 3-133007
Jun. 7, 1991 [JP] Japan .................. 3-136601

[51] Int. Cl.⁵ .................. H03H 7/30; H03H 7/40; H03K 5/159
[52] U.S. Cl. .................. 375/11; 375/14; 364/724.2
[58] Field of Search .................. 375/11, 12, 14; 364/724.19, 724.2

[56] References Cited

U.S. PATENT DOCUMENTS

| | | | |
|---|---|---|---|
| 5,097,482 | 3/1992 | Serizawa et al. | 375/14 X |
| 5,155,742 | 10/1992 | Ariyavisitakual et al. | 375/14 X |
| 5,173,924 | 12/1992 | Hiraiwa et al. | 375/12 |

OTHER PUBLICATIONS

Adaptive Equalization, Shahid Qureshi, IEEE Communications Magazine Mar. 1982, pp. 9-16.

*Primary Examiner*—Stephen Chin
*Assistant Examiner*—Bryan E. Webster
*Attorney, Agent, or Firm*—Ronald P. Kananen

[57] ABSTRACT

An input signal composed of a predetermined total number of symbols is supplied to a series circuit of delay units. The input signal and delayed output signals from the delay units are multiplied by coefficients, and the products are added into an equalized output signal. The supplied input signal is transmitted, successively in normal, opposite, and normal directions, through a predetermined number of delay units corresponding to a unit number of symbols which is smaller than the predetermined total number of symbols to delay the input signal successively with those delay units. Each time the input signal is transmitted in the series circuit in one of the directions, an amplitude error of the equalized output signal is detected. In order to minimize the amplitude error, coefficients by which to multiply the input signal and the delayed output signals are calculated depending on the detected amplitude error. Alternatively, the input signal is divided into a plurality of blocks each composed of a predetermined number of symbols, and supplied to the series circuit to produce an equalized output signal of each of the blocks. An error signal is calculated which is composed of the sum of squares of differences between the equalized output signals and a reference signal. The coefficients are calculated depending on the rates of change of the error signal relative to the coefficients.

6 Claims, 14 Drawing Sheets

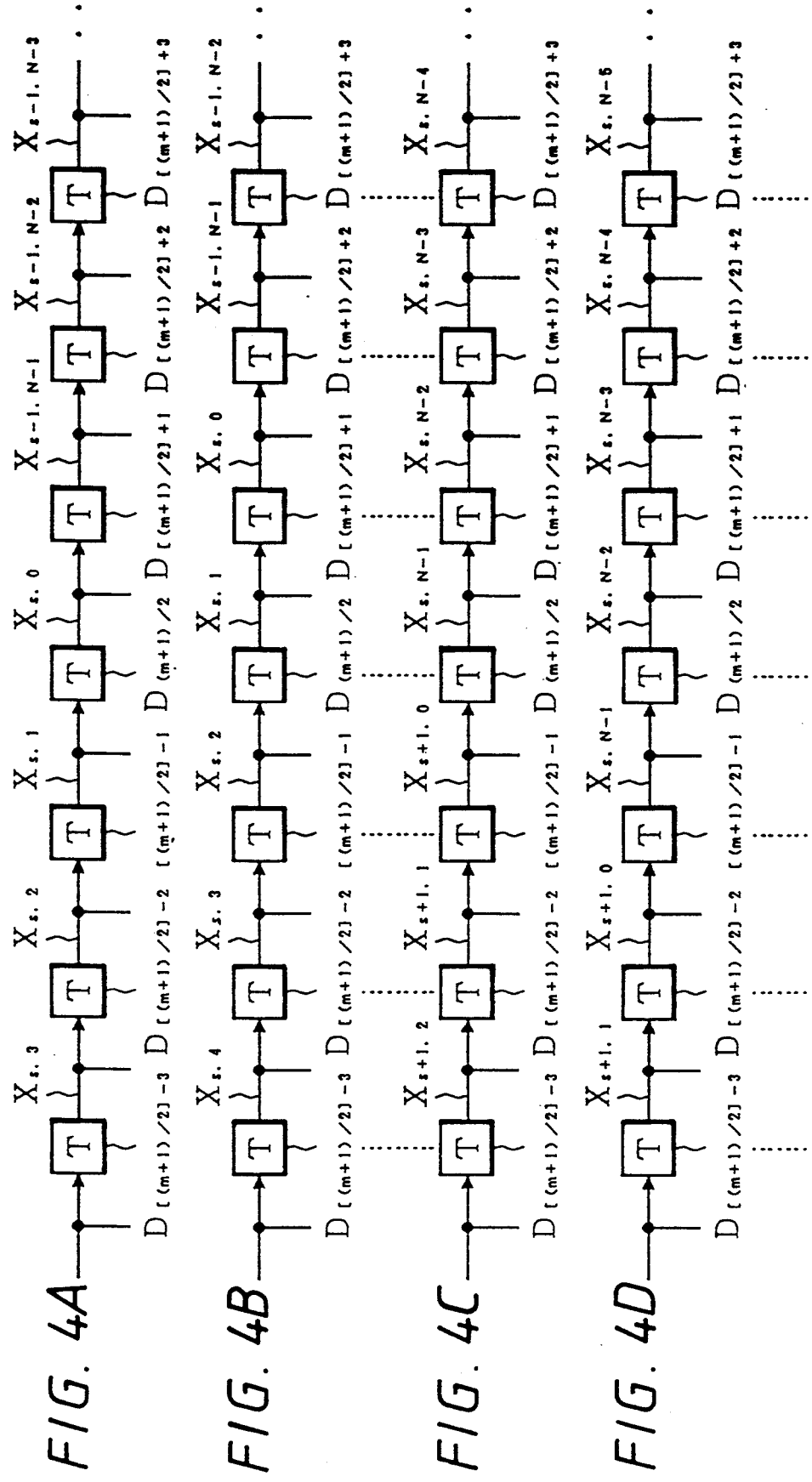

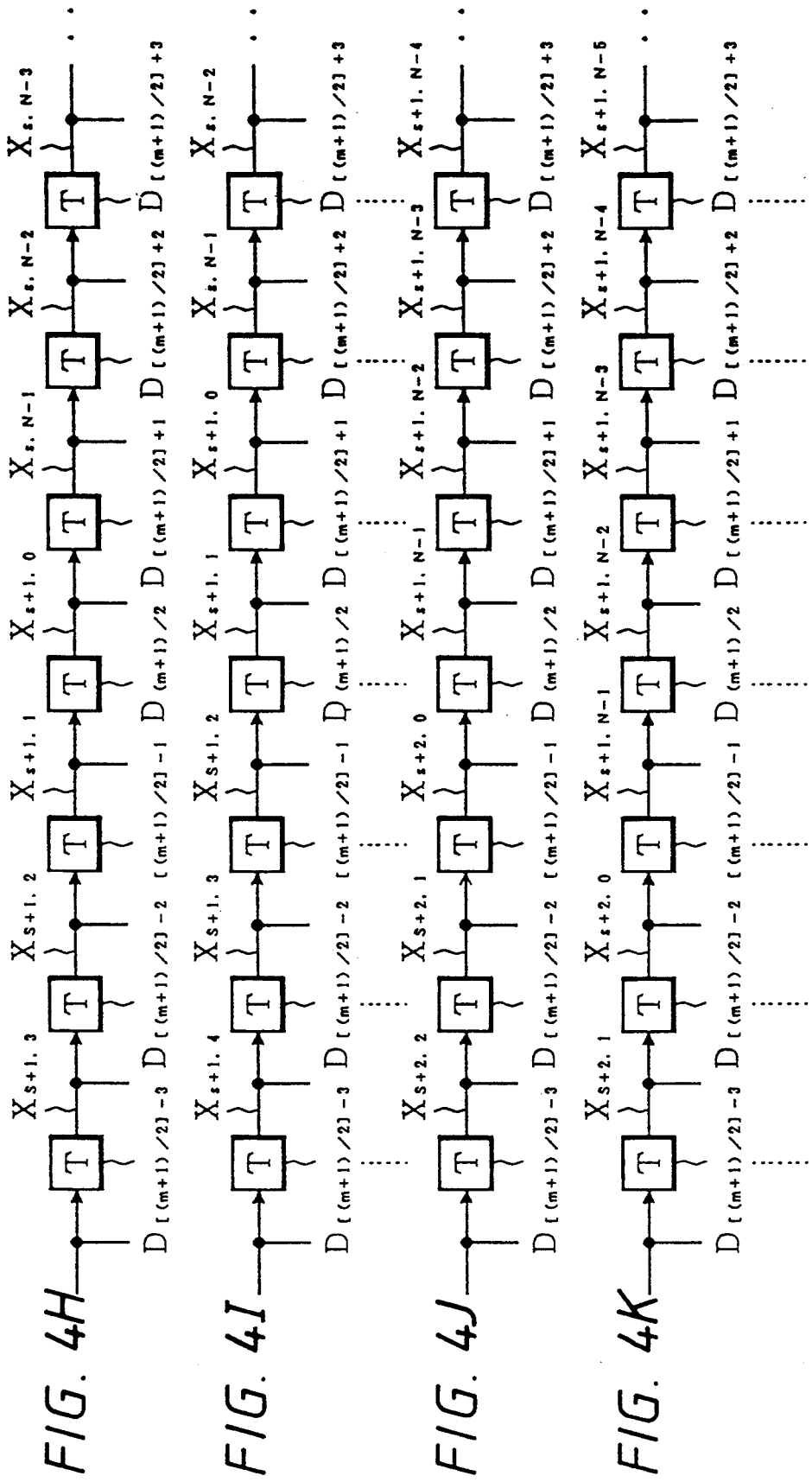

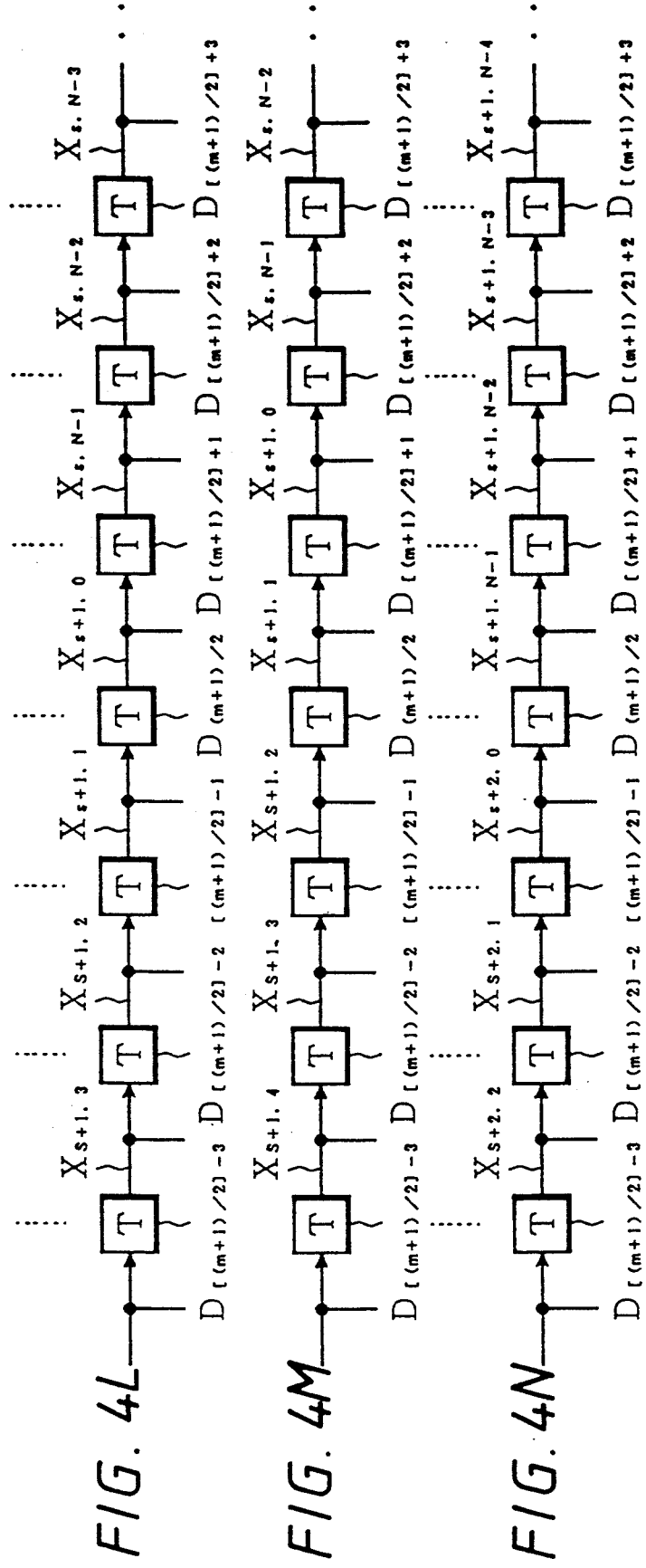

EQUALIZATION METHOD UTILIZING A DELAY CIRCUIT

BACKGROUND OF THE INVENTION

1. Field of the Invention

The present invention relates to an equalization method suitable for use in a digital cellular telecommunications system.

2. Description of the Prior Art

There are known different digital cellular telecommunications systems in which a central switching office (fixed office) and mobile units (automobile telephones) are interconnected by radio waves. One of such digital cellular telecommunications systems is a time-division multiple access system. According to the time-division multiple access system, each channel of 900 MHz bandwidth is allotted six time slots, for example, for signal reception, and in each time slot a signal is received for 20 msec. within a time period of 120 msec. Similarly, six time slots for signal transmission are assigned to each channel, and a signal is transmitted in each time slot. The reference reception carrier frequency and the reference transmission carrier frequency are different from each other.

When a received signal (burst signal) is equalized by an equalizer in the central switching office or the mobile units, since the signal is received in a very short period of time (20 msec. in the above example), a signal portion corresponding to an initial portion of the received signal tends to drop from the equalized output signal from the equalizer. Furthermore, because the mobile unit moves at high speed, the characteristics of the received signal are likely to change abruptly due to Rayleigh fading or frequency-selective fading. Therefore, demodulating such received signal requires an automatic equalizer of quick convergence.

One known algorithm having high-speed convergence characteristics is the RLS (Kalman) algorithm. Since, however, this algorithm requires a vast amount of calculation $O(u^2)$ (u: the number of taps) and high calculation accuracy, it cannot easily be implemented by a digital signal processor (DSP).

Another known algorithm which requires less calculation accuracy and a smaller amount of calculation is the LMS algorithm. However, the LMS algorithm is not suitable for digital mobile telecommunication systems as its convergence speed is low.

The applicant has proposed, in Japanese patent application No. 2-130752, an equalization method (automatic equalization method) for supplying an input signal (burst signal) to a series circuit of plural delay means, multiplying the input signal and delayed output signals from the delay means by coefficients, and adding the products into an equalized output signal. The proposed equalization method comprises the steps of supplying the input signal to the series circuit, transmitting the input signal in a normal direction entirely through the series circuit to delay the input signal successively with the delay means, thereafter transmitting the input signal in an opposite direction through a predetermined number of delay means to delay the input signal successively with the predetermined number of delay means, thereafter transmitting the input signal in the opposite direction entirely through the series circuit to delay the input signal successively with the delay means, thereafter transmitting the input signal in the normal direction entirely through the series circuit to delay the input signal successively with the delay means, detecting an amplitude error of the equalized output signal each time the input signal is transmitted in the series circuit in one of the normal direction, the opposite direction, and the normal direction, and calculating coefficients by which to multiply the input signal and the delayed output signals from the respective delay means, depending on the detected amplitude error, in order to minimize the amplitude error.

However, if the transmission characteristics of the input signal (burst signal) vary, then the proposed equalization method tends to fail to converge, but become divergent.

OBJECTS AND SUMMARY OF THE INVENTION

In view of the aforesaid problems of the prior equalization method, it is an object of the present invention to provide an equalization method which is convergent at high speed, operates stably, and can easily be implemented by a digital signal processor.

According to the present invention, there is provided an equalization method for supplying an input signal composed of a predetermined total number of symbols to a series circuit of plural delay means, multiplying the input signal and delayed output signals from the delay means by coefficients, and adding the products into an equalized output signal, the equalization method comprising the steps of supplying the input signal to the series circuit, transmitting the input signal in a normal direction through a predetermined number of delay means corresponding to a unit number of symbols which is smaller than the predetermined total number of symbols to delay the input signal successively with those delay means, hereafter transmitting the input signal in an opposite direction through the predetermined number of delay means to delay the input signal successively with those delay means, thereafter transmitting the input signal in the normal direction through the predetermined number of delay means to delay the input signal successively with those delay means, detecting an amplitude error of the equalized output signal each time the input signal is transmitted in the series circuit in one of the normal direction, the opposite direction, and the normal direction, and calculating coefficients by which to multiply the input signal and the delayed output signals from the respective delay means, depending on the detected amplitude error, in order to minimize the amplitude error.

According to the present invention, there is also provided an equalization method for supplying an input signal composed of a predetermined total number of symbols to a series circuit of plural delay means, multiplying delayed output signals from the delay means by coefficients, and adding the products into an equalized output signal, the equalization method comprising the steps of dividing the input signal into a plurality of blocks each composed of a predetermined number of symbols, supplying the input signal to the series circuit to produce an equalized output signal of each of the blocks, calculating an error signal of each of the blocks which is composed of the sum of squares of differences between the equalized output signals and a reference signal, and varying the coefficients by which to multiply the delayed output signals from the delay means, depending on the rates of change of the error signal of each of the blocks with respect to the coefficients.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

The principles of the present invention are incorporated in a time-division multiplex access system which is one of digital cellular telecommunications systems in which a central switching office (fixed office) and mobile units (automobile telephones) are interconnected by radio waves. According to the time-division multiple access system, each channel of 900 MHz bandwidth is allotted six time slots, for example, for signal reception, and in each time slot a signal is received for 20 msec. within a time period of 120 msec. Similarly, six time slots for signal transmission are assigned to each channel, and a signal is transmitted in each time slot. The reference reception carrier frequency and the reference transmission carrier frequency are different from each other.

Figure 1:
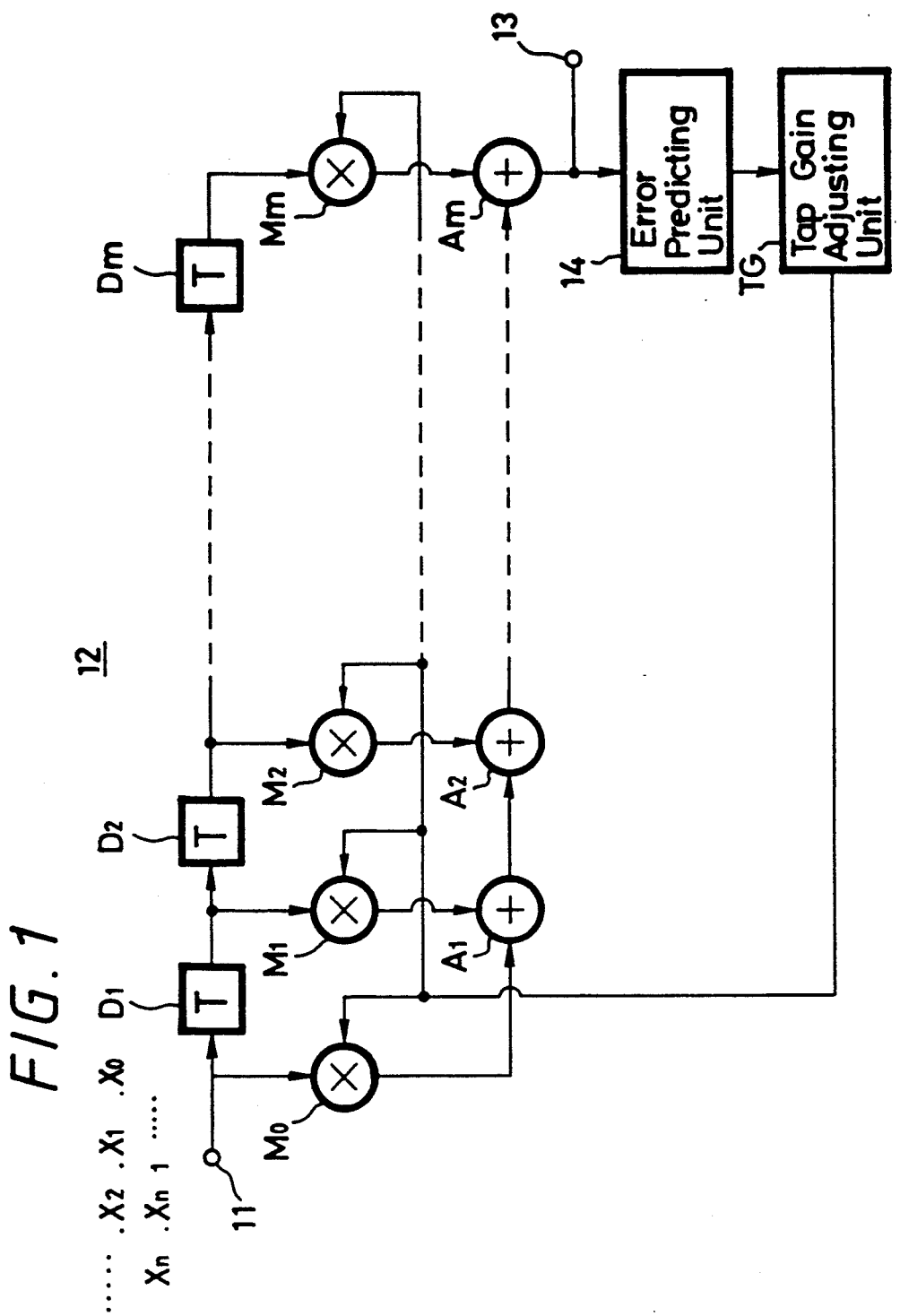
FIG. 1 is a block diagram of an equalization method according to an embodiment of the present invention.

FIG. 1 shows an equalization method according to the present invention. The illustrated equalization method is a circuit representation of a signal processing operation carried out by the firmware of a digital signal processor in a transmitter/receiver of a mobile unit (automobile telephone). The signal processing operation may be effected by the structure of hardware shown in FIG. 1 which may be in the form of a circuit of discrete components or an integrated circuit.

Figure 2:
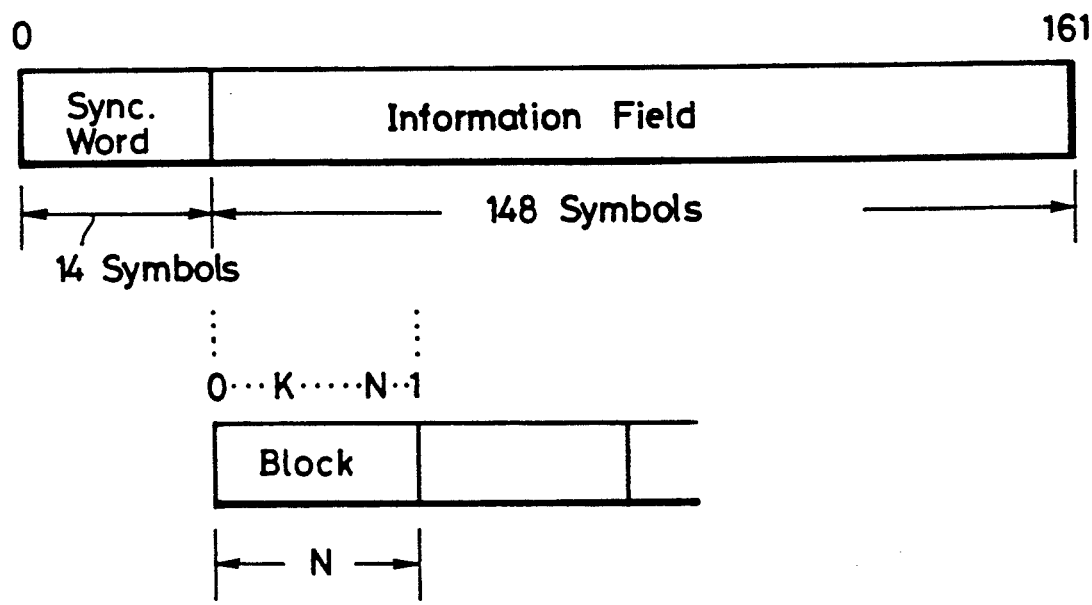
FIG. 2 is a diagram showing an input signal to be used in the method shown in FIG. 1.

The circuit shown in FIG. 1 includes an equalizing filter section 12 that is supplied with an input signal which is burst signals received in time slots of 20 msec., i.e., sampled signals $X_0, X_1, X_2, \ldots, X_n$, from an input terminal 11. As shown in FIG. 2, the input signal may be composed of a sync word of 14 symbols and an information field of 148 symbols which follows the sync word. The information field of 148 symbols is divided into a plurality of blocks each composed of N symbols $0, 1, 2, \ldots, k, \ldots, N-1$. If the sync word of 14 symbols is more than N symbols, then it may be divided into blocks each composed of N symbols.

As shown in FIG. 1, the equalizing filter section 12 comprises a series circuit of delay means $D_1, D_2, \ldots, D_m$ each for delaying the input signal for a time delay equal to one sampling period Ts for the input signal, coefficient multiplying means $M_0, M_1, M_2, \ldots, M_m$ supplied respectively with the input signal and delayed output signals from the $D_1, D_2, \ldots, D_m$, for multiplying them by a coefficient, and adding means $A_1, A_2, \ldots, A_m$ supplied respectively with multiplied output signals from the coefficient multiplying means $M_0, M_1, M_2, \ldots, M_m$, for adding the supplied multiplied output signals, the adding means $A_m$ producing an equalized output signal that will be outputted from an output terminal 13.

An error predicting unit 14 is supplied with the equalized output signal from the adding means Am of the equalizing filter section 12, for outputting a decision signal. A tap gain adjusting unit TG is supplied with the decision signal from the error predicting unit 14, for producing the coefficient signal which is supplied to the coefficient multiplying means $M_0, M_1, M_2, \ldots, M_m$. The reference characters n, m referred to above have a relationship: n > m.

Figure 3:
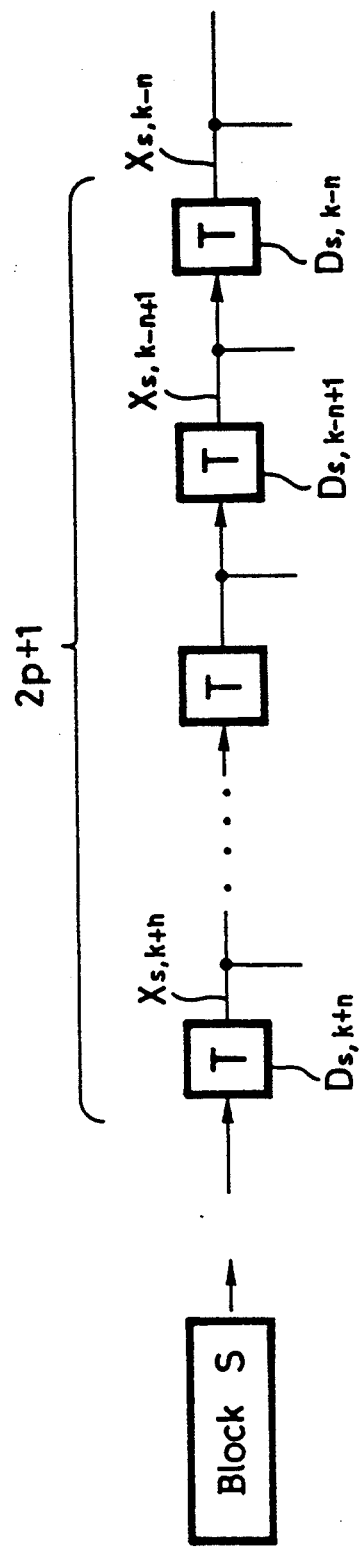
FIG. 3 is a diagram showing delayed output signals from respective delay means of an equalizing filter section which is implemented by the method shown in FIG. 1.

FIG. 3 shows delayed output Signals from the respective delay means. More specifically, sampled signals $X_{s, k+n}, \ldots, X_{s, k-n+1}, X_{s, k-n}$ of N [$=2n+1(n=0, 1, 2, \ldots)$] symbols in the block s among sampled signals $X_0, X_1, X_2, \ldots, X_n$ are outputted respectively from delay means $D_{s, k+n}, \ldots, D_{s, k-n+1}, D_{s, k-n}$.

Figures 4E, 4F, 4G:
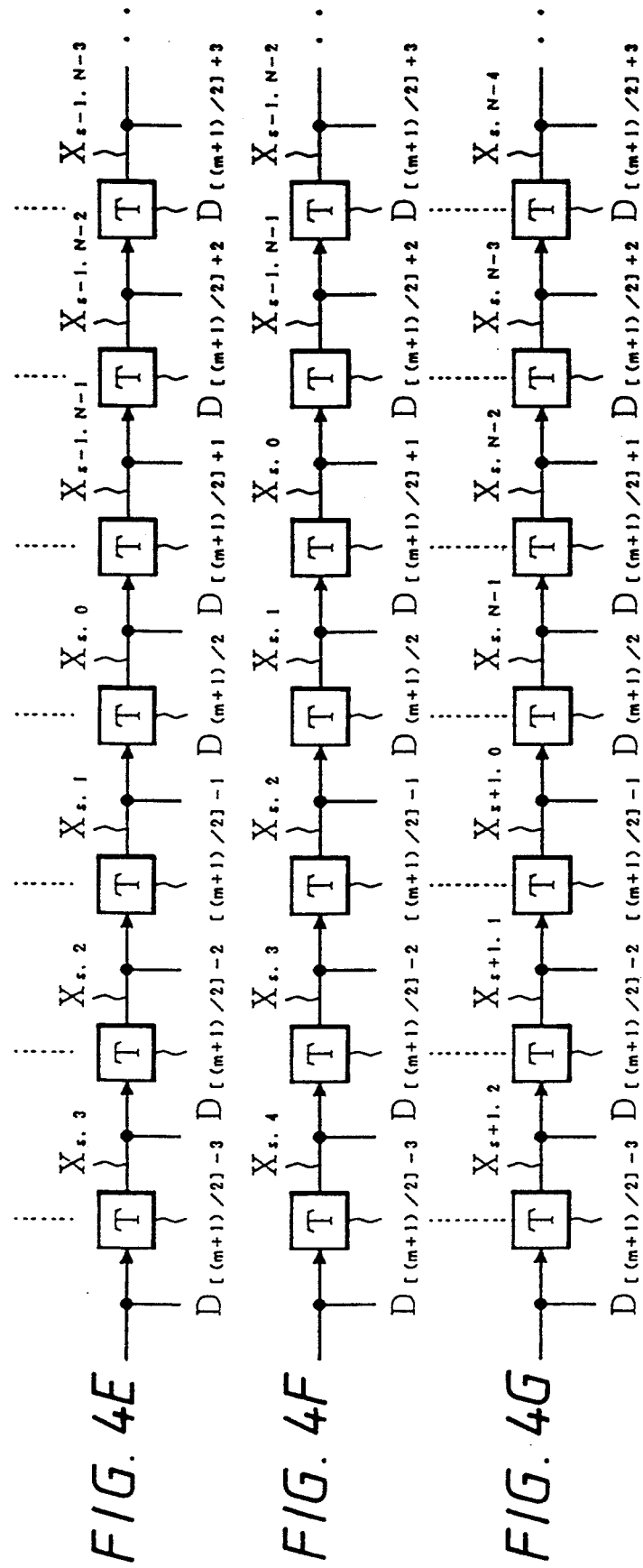
FIGS. 4A through 4N are diagrams illustrative of an operation sequence of the equalization method.

An input signal composed of the sampled signals $X_0, X_1, X_2, \ldots, X_n$ is supplied to the series circuit of the delay means $D_1, D_2, \ldots, D_m$, and transmitted in a normal direction through a predetermined number N of delays means, which corresponds to the unit number N of symbols, so that the input signal is delayed successively by these delay means, as shown in FIGS. 4A, 4B. Thereafter, as shown in FIGS. 4C, 4D, the input signal is transmitted in the opposite direction through the N delay means, so that the input signal is delayed successively by these delay means. Thereafter, as shown in FIGS. 4E, 4F, the input signal is transmitted in the normal direction through the N delay means, so that the input signal is delayed successively by these delay means. Each time the input signal is thus transmitted in the series circuit in one of the normal direction, the opposite direction, and the normal direction, an amplitude error of the equalized output signal is detected by the error predicting unit 14. Depending on the detected amplitude error, coefficients by which to multiply the input signal and the delayed output signals from the respective delay means $D_1, D_2, \ldots, D_m$ in the coefficient multiplying means $M_0, M_1, M_2, \ldots, M_m$ are calculated by the tap gain adjusting unit TG in order to minimize the amplitude error.

Then, as shown in FIGS. 4G, 4H, 4I, the input signal is transmitted in the normal direction through a predetermined number N of delays means, which corresponds to the unit number N of symbols, so that the input signal is delayed successively by these delay means. Thereafter, as shown in FIGS. 4J, 4K, the input signal is transmitted in the opposite direction through the N delay means, so that the input signal is delayed successively by these delay means. Thereafter, as shown in FIGS. 4L, 4M, and 4N, the input signal is transmitted in the normal direction through the N delay means, so that the input signal is delayed successively by these delay means. Each time the input signal is thus transmitted in the series circuit in one of the normal direction, the opposite direction, and the normal direction, an amplitude error of the equalized output signal is detected by the error predicting unit 14. Depending on the detected amplitude error, coefficients by which to multiply the input signal and the delayed output signals from the respective delay means $D_1, D_2, \ldots, D_m$ in the coefficient multiplying means $M_0, M_1, M_2, \ldots, M_m$ are calculated by the tap gain adjusting unit TG in order to minimize the amplitude error.

The above operation is repeated successively until the sampled signal $X_n$ reaches the input terminal 11.

FIGS. 4A through 4N show the output signals from delay means $D_{[(m+1)/2]-3} \sim D_{[(m+1)/2]+3}$ positioned forwardly and rearwardly of the central delay means $D_{(m+1)/2}$ among the delay means $D_1, D_2, \ldots, D_m$, where m is an odd number. These output signals are some of the sampled signals $X0, X_1, X_2, \ldots, X_n$, and indicated by a reference character X with a suffix indicating the block number (s, s+1, s+2, etc.) and the sampling number $(0, 1, 2, \ldots, N-1)$ in the block.

Figure 5:
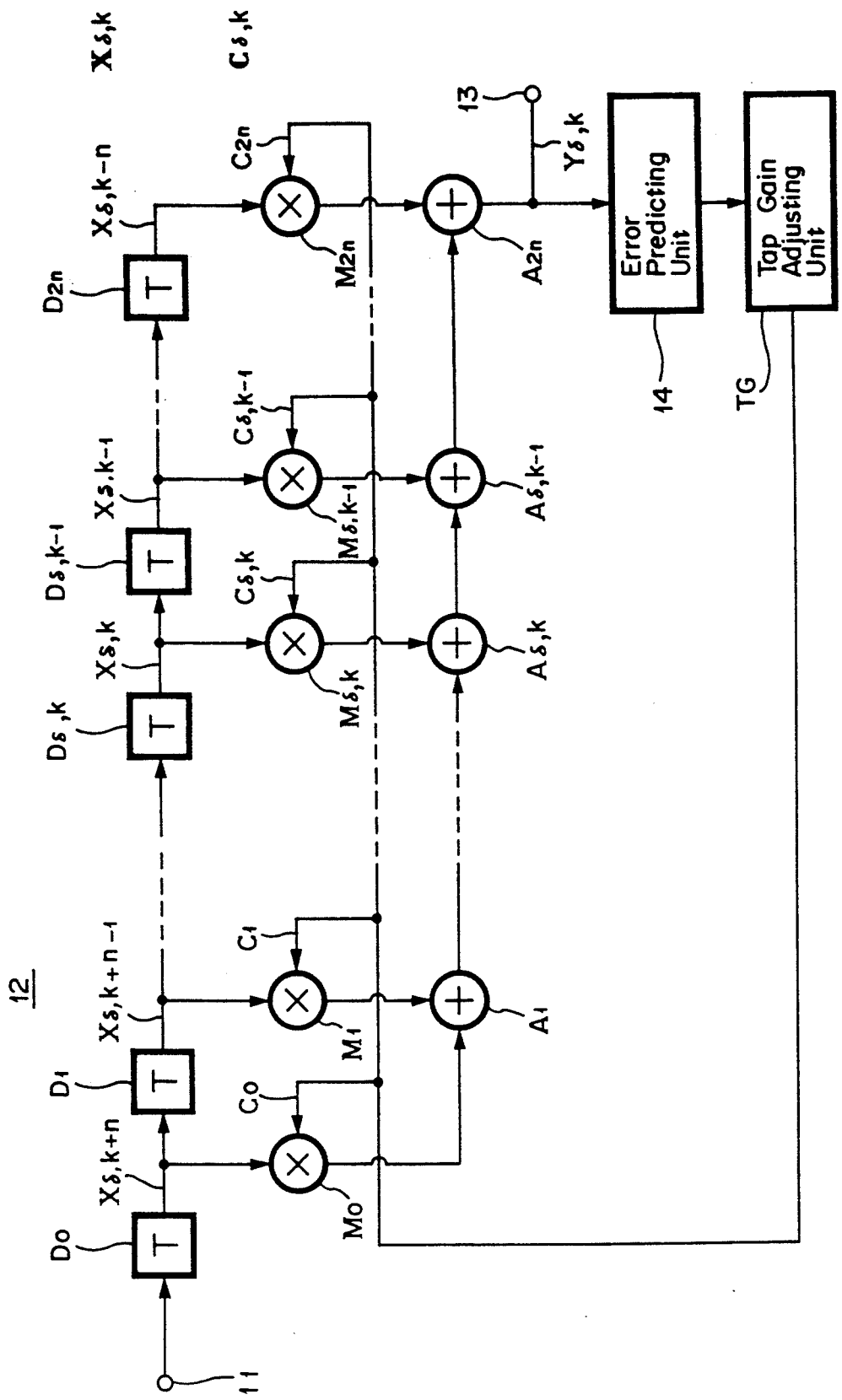
FIG. 5 is a block diagram of an equalization method according to another embodiment of the present invention.

In FIGS. 4A through 4N, the output signal from the central delay means $D_{(m+1)/2}$, for example, varies as follows:

FIG. 4A: $X_{s,0}$,
FIG. 4B: $X_{s,1}, \ldots$,
FIG. 4C: $X_{s,N-1}$,
FIG. 4D: $X_{s,N-2}, \ldots$,
FIG. 4E: $X_{s,0}$,
FIG. 4F: $X_{s,1}, \ldots$,
FIG. 4G: $X_{s,N-1}$,
FIG. 4H: $X_{s+1,0}$,
FIG. 4I: $X_{s+1,1}, \ldots$,
FIG. 4J: $X_{s+1,N-1}$,
FIG. 4K: $X_{s+1,N-2}, \ldots$,
FIG. 4L: $X_{s+1,0}$,
FIG. 4M: $X_{s+1,1}, \ldots$,
FIG. 4N: $X_{s+1,N-1}$ FIG. 5 shows an equalization method according to another embodiment of the present invention. The equalization method shown in FIG. 5 is also a circuit representation of a signal processing operation carried out by the firmware of a digital signal processor in a transmitter/receiver of a mobile unit (automobile telephone). The signal processing operation may be effected by the structure of hardware shown in FIG. 5 which may be in the form of a circuit of discrete components or an integrated circuit.

Figure 6:
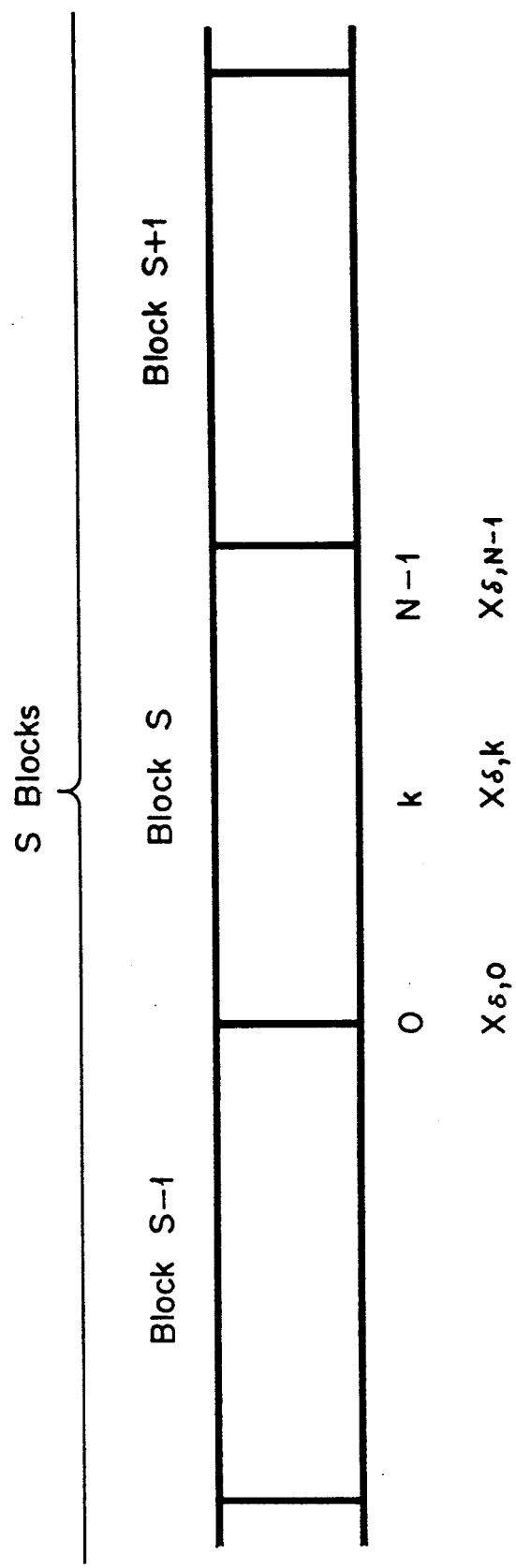
FIG. 6 is a diagram showing an input signal to be used in the method shown in FIG. 5.

The circuit shown in FIG. 5 includes an equalizing filter section 12 which is supplied with an input signal. The input signal is burst signals received in time slots of 20 msec. For example, the input signal comprises received burst signals comprising sampled signals composed of 162 symbols, and is divided, as shown in FIG. 6, into S blocks $0, 1, \ldots, s-1, s, s+1, \ldots, S-1$. Each of the blocks is composed of N symbols $0, 1, 2, \ldots, k, \ldots, N-1$.

The equalizing filter section 12 comprises a series circuit of $(2n+1)$ delay means $D_0, D_1, D_2, \ldots, D_{2n}$ each for delaying an input signal for a time delay equal to one sampling period T of the input signal, $(2n+1)$ coefficient multiplying means (variable gain amplifying means) $M_0, M_1, \ldots, M_{s,k}, M_{s,k-1}, \ldots, M_{2n}$ supplied with respective delayed output signals from the delay means $D_0, D_1, D_2, \ldots, D_{2n}$, and 2n adding means $A_0, A_1, A_2, \ldots, A_{2n}$ for adding multiplied output signals from the coefficient multiplying means $M_0, M_1, \ldots, M_{s,k}, M_{s,k-1}, \ldots, M_{2n}$, the adding means $A_{2n}$ producing an equalized output signal that will be outputted from an output terminal 13.

An error predicting unit 14 is supplied with the equalized output signal from the adding means $A_{2n}$ of the equalizing filter section 12, for outputting a decision signal. A tap gain adjusting unit TG is supplied with the decision signal from the error predicting unit 14, for producing the coefficient signal which is supplied to the coefficient multiplying means $M_0, M_1, M_2, \ldots, M_{2n}$.

In FIG. 5, sampled signals $X_{s,k+n}, X_{s,k+n-1}, \ldots, X_{s,k}, X_{s,k-1}, \ldots, X_{s,k-n}$ of $N (=2n+1)$ symbols in the block s are outputted respectively from the $(2n+1)$ delay means $D_0, D_1, \ldots, D_{s,k}, D_{s,k-1}, \ldots, D_{2n}$ (the delay means $D_{s,k}$ is the central delay means among the $(2n+1)$ delay means). The $(2n+1)$ coefficient multiplying means $M_0, M_1, \ldots, M_{s,k}, M_{s,k-1}, \ldots, M_{2n}$ multiply the delayed output signals from the delay means by respective coefficients $C_0, C_1, \ldots, C_{s,k}, C_{s,k-1}, \ldots, C_{2n}$. At this time, the data vector of the equalizing filter section 12 is expressed as follows:

$$\mathbf{X}^T_{s,k} = \{X_{s,k+n}, X_{s,k+n-1}, \ldots, X_{s,k}, X_{s,k-1}, \ldots, X_{s,k-n}\} \quad \ldots (1).$$

The coefficient vector (tap coefficient vector) of the equalizing filter section 12 in the block s is expressed as follows:

$$\mathbf{C}_s^T = \{C_0, C_1, \ldots, C_{2n}\} \quad \ldots (2).$$

The coefficients in the above coefficient vector are of constant values in the block s.

At this time, the output terminal 13 of the equalizing filter section 12 produces an output signal which is expressed below:

$$Y_{s,k} = \mathbf{C}^{T*} \mathbf{X}_{s,k} \quad \ldots (3)$$

where * represents a complex conjugate.

The error predicting unit 14 subtracts the output signal represented by the above equation (3) from a reference signal $d_{s,k}$, thus producing an equalized error given as follows:

$$e_{s,k} = d_{s,k} - \mathbf{C}^{T*} \mathbf{X}_{s,k} \quad \ldots (4).$$

The sum of squares of the equalized errors in the block s, which is referred to as an error in the block s, is calculated as follows:

$$\xi_s = \sum_{k=0}^{N-1} |e_{s,k}|^2. \quad (5)$$

The coefficient vector is updated using the above error so that the error will be minimized. The updated coefficient vector is represented by:

$$\mathbf{C}_s' = \mathbf{C}_s + \alpha \frac{\partial \xi_s}{\partial \mathbf{C}_s} = \mathbf{C}_s + \alpha \sum_{k=0}^{N-1} e_{s,k}^* \mathbf{X}_{s,k} \quad (6)$$
$$= \mathbf{C}_s + \alpha \Delta \mathbf{C}_s.$$

The updated coefficient vector is replaced as indicated below, and the equalization of the block s is repeated from the outset.

$$\mathbf{C}_s' \to \mathbf{C}_s \quad \ldots (7).$$

The updating of the coefficient vector is repeated several times, thus providing an algorithm that is highly stable and quickly convergent.

Figure 7A:
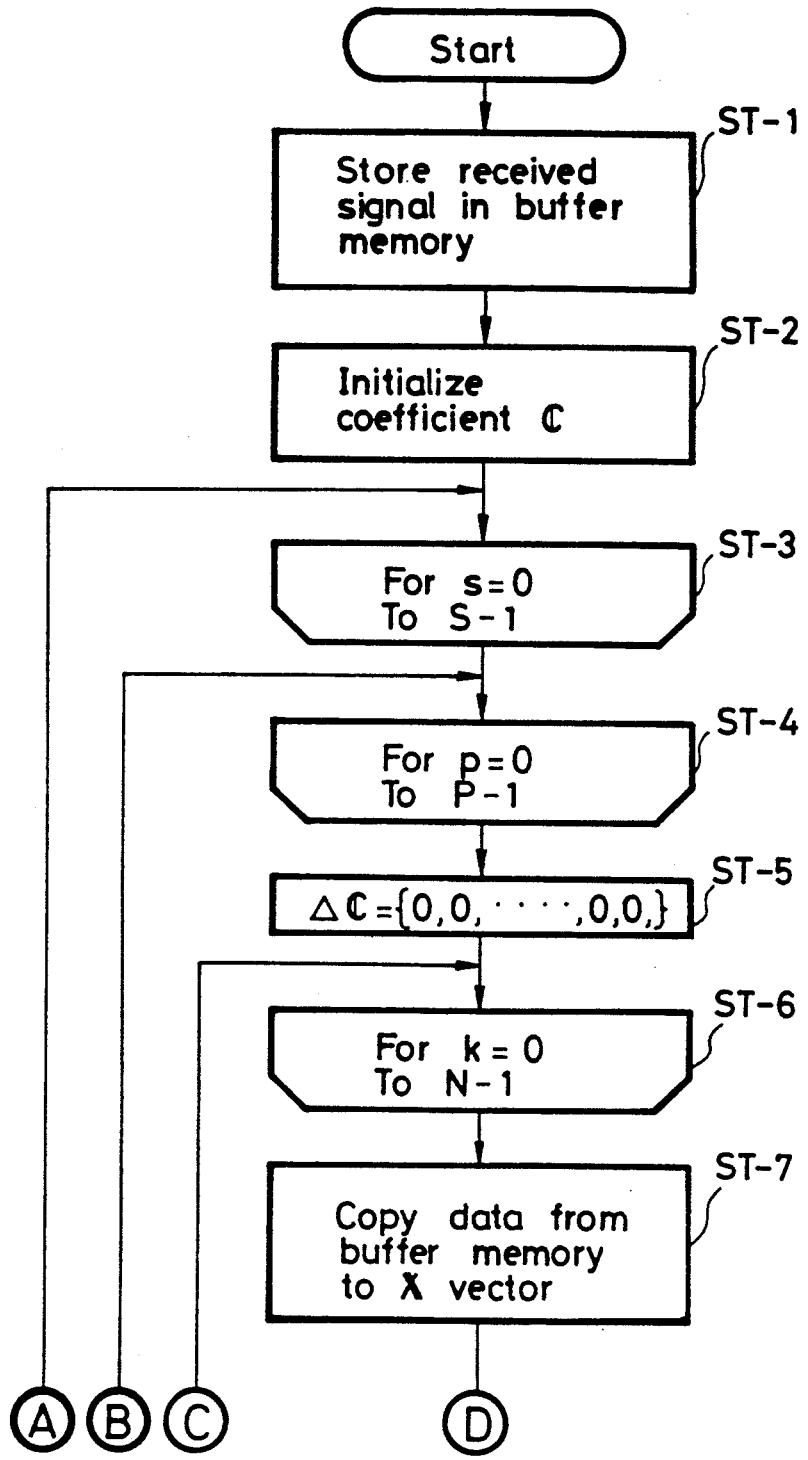
FIG. 7 is a flowchart of the equalization method.
Figure 7B:
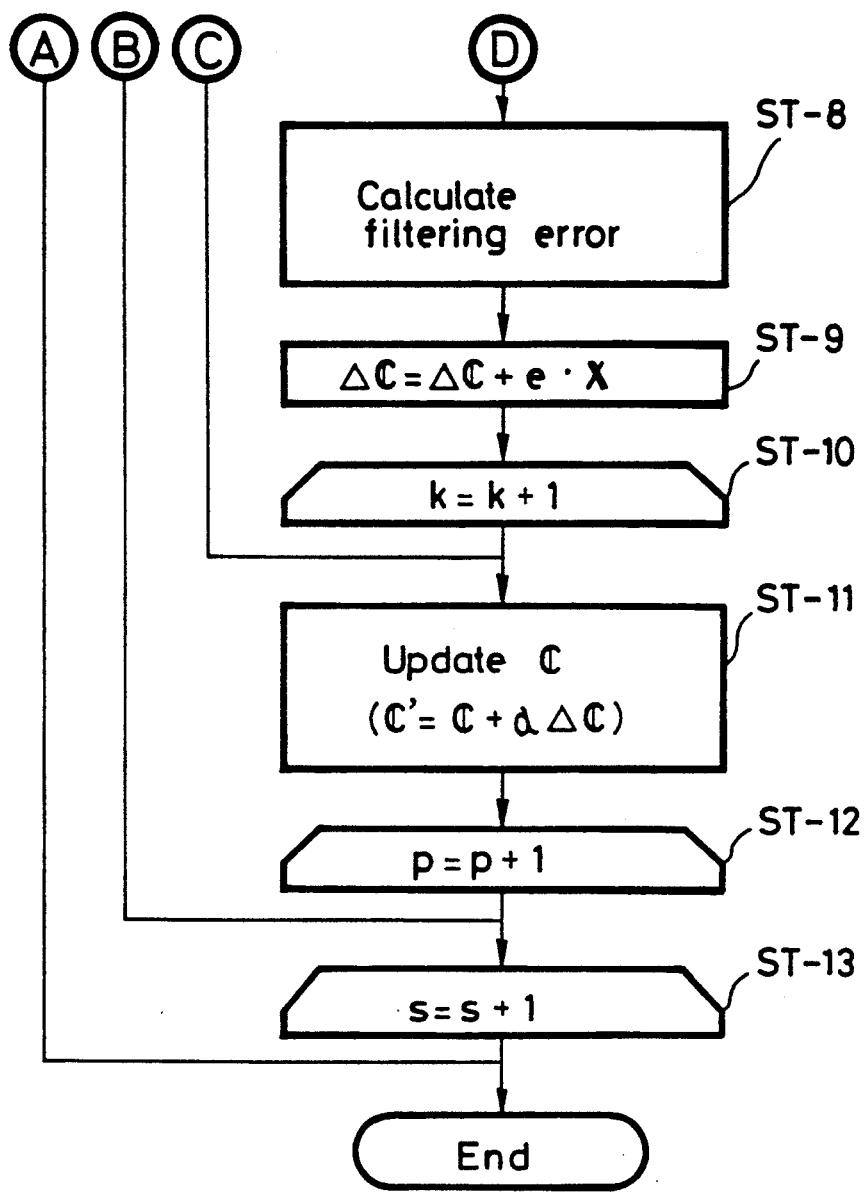

A sequence of the equalization method will be described below with reference to the flowchart of FIG. 7.

In a step ST1-1, a received burst signal of 162 symbols, for example, is stored in a buffer memory (not shown). Then, the coefficients $\mathbb{C}$ are initialized in a step ST-2. At this time, the coefficient $C_{s,k}$ supplied to the central coefficient multiplying means $M_{s,k}$ may be set to "1", and the other coefficients to "0". Thereafter, control goes to a step ST-3.

In the step ST-3, the block number s is changed successively from 0 to S-1 in each cycle.

Thereafter, the number p of repetitions in the received burst signal is changed successively from 0 to P-1 in each cycle in a step ST-4.

In a step ST-5, the following calculation is carried out:

$$\Delta\mathbb{C} = \{0, 0, \ldots, 0\} \quad \ldots (8).$$

Then, the number k of symbols in the block is changed successively from 0 to N-1 in each cycle in a step ST-6.

Figure 8:
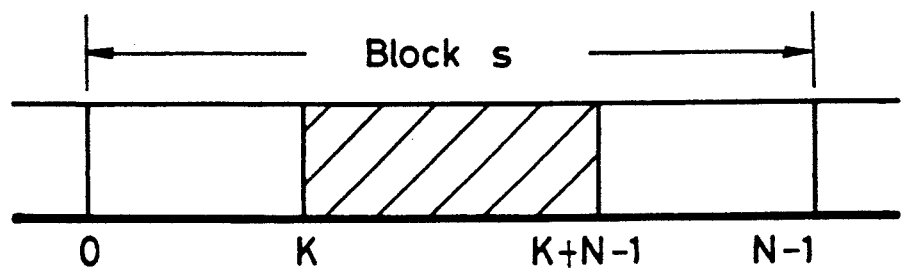
FIG. 8 is a diagram showing a block.

In a step ST-7, the data from the buffer memory are copied into a buffer memory of $\mathbb{X}$ vector. The data from the buffer memory are sampled data from the symbols k to k+N-1 in the block s shown in FIG. 8. Thereafter, control goes to a step ST-8.

In the step 8, a filter output signal Y is determined using the X vector according to the equation $Y = \mathbb{C}^T\mathbb{X}$. Then, the filter output signal Y is subtracted from a reference d, thus producing a filtering error e.

Thereafter, the equation $\Delta\mathbb{C} = \Delta\mathbb{C} + e\cdot\mathbb{X}$ is calculated using the filtering error e thus determined, in a step ST-9.

In a step ST-10, the number k is incremented by 1 (k=k+1). Then, control returns to the step ST-6. If the number k reaches k=N-1, then control goes from the step ST-10 to a step ST-11.

In the step ST-11, in order to minimize the filtering error e, the coefficients $\mathbb{C}$ are updated according to $\mathbb{C}' = \mathbb{C} + \alpha\Delta\mathbb{C}$ where $\alpha$ is a step coefficient.

Then, the number p is incremented by 1 (p=p+1) in a step ST-12, after which control returns to the step ST-4. If the number p reaches p=P-1, then control goes from the step ST-12 to a step ST-13.

In the step ST-13, the number s is incremented by 1 (s=s+1). Then, control goes back to the step ST-3. If the number s reaches s=S-1, then the sequence is ended.

A $\pi/4$-shifted quadrature phase keying modulator to which the equalization method according to the present invention is applied will be described below with reference to FIGS. 9, 10A, 10B, and 10C. The equalization method is not limited to use in such a modulator, and may be applied to circuit arrangements in both analog and digital communication systems.

Figure 9:
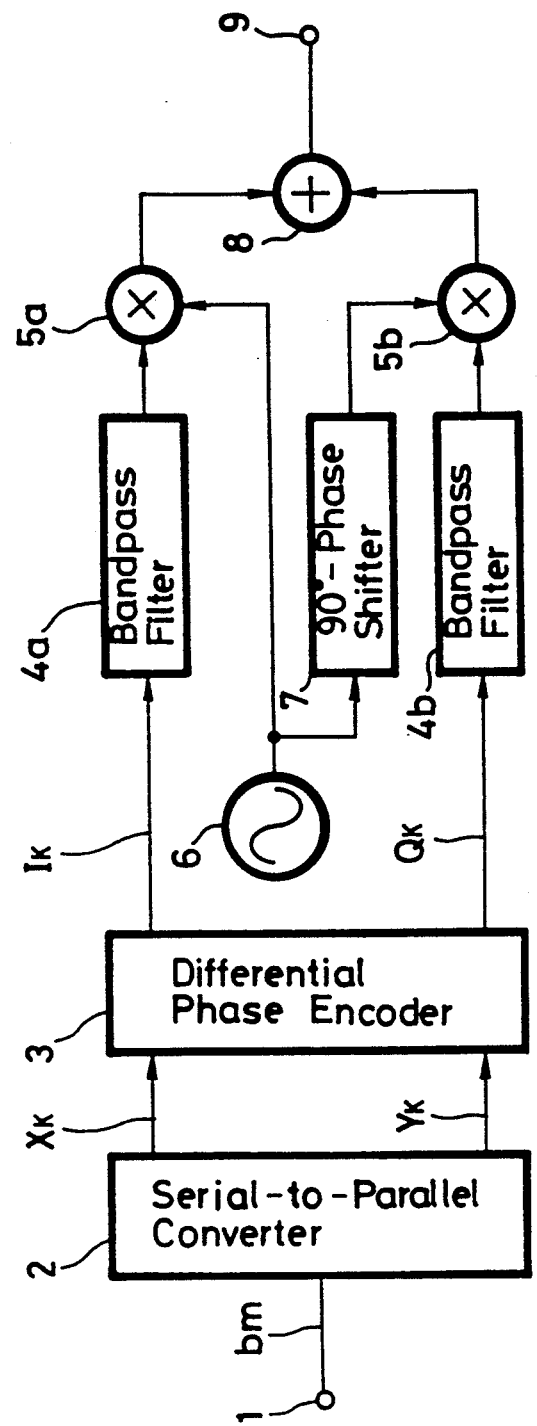
FIG. 9 is a block diagram of a modulator to which the equalization method according to the invention may be applied.

As shown in FIG. 9, a serial digital audio signal bm is supplied to a serial-to-parallel converter 2 that converts the supplied serial digital audio signal bm into parallel 2-bit digital signals $X_k$, $Y_k$, which are then supplied to a differential phase encoder 3.

Figure 10A:
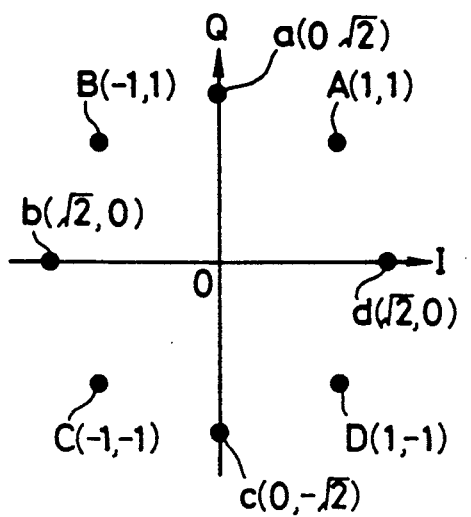
FIGS. 10A, 10B, and 10C are diagrams illustrative of an encoding process of a differential phase encoder of the modulator shown in FIG. 9.
Figure 10B:
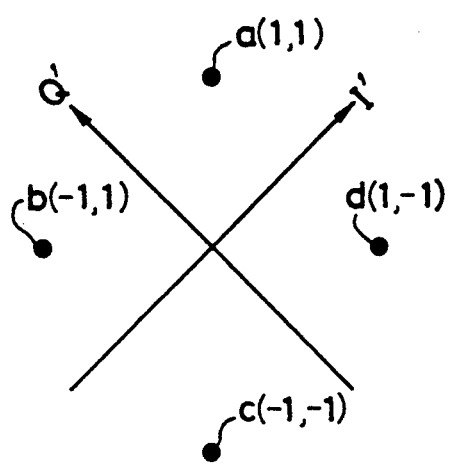
Figure 10C:
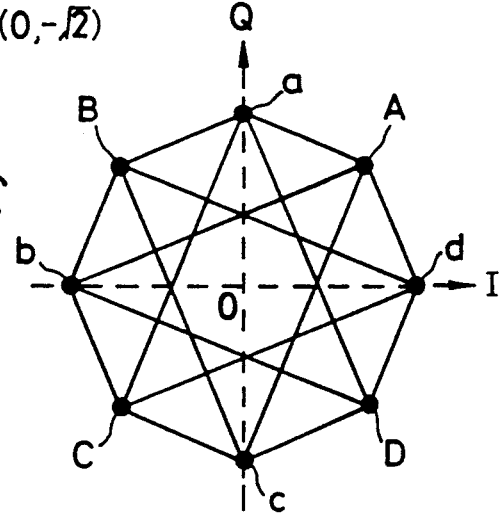

FIGS. 10A, 10B, and 10C show an encoding process of the differential phase encoder 3. As shown in FIG. 10A, points A (1, 1), B (-1, 1), C (-1, -1), D (1, -1) are determined on a coordinate system having an I-axis (real axis) and a Q-axis (imaginary axis) that are orthogonal to each other in a Z-plane. As shown in FIG. 10B, points a (1, 1), b (-1, 1), c (-1, -1), d (1, -1) are determined on a coordinate system which has an I'-axis (real axis) and a Q'-axis (imaginary axis) that are orthogonal to each other and which is provided by rotating the coordinate system with the I- and Q-axes through 45° ($\pi/4$). The coordinate system with the I'- and Q'-axes is translated into superposed relationship to the coordinate system with the I- and Q-axes so that their origins are aligned with each other. Then, the points a, b, c, d on the coordinate system with the I'- and Q'-axes have respective coordinates on the coordinate system with the I- and Q-axes, as follows:

$$a(0, \sqrt{2}), b(-\sqrt{2}, 0), c(0, -\sqrt{2}), d(\sqrt{2}, 0).$$

Encoded output signals $I_k$, $Q_k$ from the encoder 3 represent, on the coordinate system with the I- and Q-axes, the movement from any one of the points A~D to any one of the points a~d depending on the 2-bit output signals $X_k$, $Y_k$ from the serial-to-parallel converter 2, and the movement from any one of the points a~d to any one of the points A~D depending on the 2-bit output signals $X_k$, $Y_k$ from the serial-to-parallel converter 2, respectively. Such movements between those points A~D and a~d are shown in FIG. 10C. Those movements do not pass through the origin of the coordinate system.

The movements between the points A~D and a~d on the coordinate system with the I- and Q-axes can be indicated by changes (differences) $\Delta\Phi$ in angles of straight lines that interconnect the points and the origin.

The relationship between the output signals $X_k$, $Y_k$ and the angle changes $\Delta\Phi$ is shown in the following truth table:

| $X_k$ | $Y_k$ | $\Delta\Phi$ |
|---|---|---|
| 1 | 1 | $-3\pi/4$ |
| 0 | 1 | $3\pi/4$ |
| 0 | 0 | $\pi/4$ |
| 1 | 0 | $-\pi/4$ |

The encoded output signals $I_k$, $Q_k$ are expressed as follows:

$$I_k = I_{k-1}\cdot\cos[\Delta\Phi(X_k, Y_k)] - Q_{k-1}\cdot\sin[\Delta\Phi(X_k, Y_k)]$$

$$Q_k = I_{k-1}\cdot\sin[\Delta\Phi(X_k, Y_k)] + Q_{k-1}\cdot\cos[\Delta\Phi(X_k, Y_k)].$$

The encoded output signals $I_k$, $Q_k$ are supplied respectively through baseband filters 4a, 4b to respective modulators (multipliers) 5a, 5b. The modulators 5a, 5b modulate a carrier supplied from a carrier oscillator 6 and a carrier supplied from the carrier oscillator 6 and shifted 90° in phase by a 90°-phase shifter 7 respectively with the supplied encoded output signals $I_k$, $Q_k$, i.e., multiply these carriers by the encoded output signals $I_k$, $Q_k$, respectively. Modulated output signals are then added by an adder 8 into a digital modulated signal, which is outputted from an output terminal 9.

The equalization methods according to the present invention is convergent at higher speed than the conventional simple LMS algorithm, operated more stably than the prior equalization method, and can easily be implemented by a digital signal processor.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An equalization method for supplying an input signal composed of a predetermined total number of symbols to a series circuit of plural delay means, multiplying the input signal and delayed output signals from the delay means by coefficients, and adding the products into an equalized output signal, said equalization method comprising the steps of:

supplying the input signal to the series circuit;
   transmitting the input signal in a first direction through a predetermined number of delay means corresponding to a unit number of symbols which is smaller than said predetermined total number of symbols to delay the input signal successively with the delay means;
   transmitting again the input signal in a second direction opposite to the first direction through said predetermined number of delay means to delay the input signal successively with the delay means;
   transmitting again the input signal in the first direction through said predetermined number of delay means to delay the input signal successively with the delay means;
   detecting an amplitude error of the equalized output signal each time the input signal is transmitted in the series circuit in the first direction or second direction; and
   calculating said coefficients multiplied with the input signal and the delayed output signals from the respective delay means according to the detected amplitude error whereby the amplitude error is minimized.

2. The method of claim 1 wherein the input signal is received from a cellular telecommunication transmission.

3. The method of claim 1 wherein the input signals are applied to a $\pi/4$-shifted quadrature phase keying modulator.

4. An equalization method comprising the steps of:
   dividing an input signal into a plurality of blocks each composed of a predetermined number of symbols;
   supplying the input signal to a series circuit which includes a predetermined number of delay means corresponding to a unit number of symbols which is smaller than said predetermined total number of symbols;
   transmitting the input signal in a first direction through the delay means to delay the input signal sequentially with the delay means;
   transmitting again the input signal in a second direction opposite to the first direction through said predetermined number of delay means to delay the input signal successively with the delay means;
   transmitting again the input signal in the first direction through said predetermined number of delay means to delay the input signal successively with the delay means;
   detecting an amplitude error of the equalized output signal each time the input signal is transmitted in the series circuit in the first direction or second direction
   calculating an error signal associated with each of said blocks which is composed of the sum of squares of differences between the equalized output signals and a reference signal;
   determining the rate of change of each error signal associated with each of said blocks; and
   varying the coefficients by which to multiply the delayed output signals from the delay means according to each of said rate of change of each error signal with respect to the coefficients.

5. The method of claim 4 wherein the input signal is received from a cellular telecommunication transmission.

6. The method of claim 4 wherein the input signals are applied to a $\pi/4$-shifted quadrature phase keying modulator.

* * * * *